United States Patent [19]
Adamson

[11] Patent Number: 5,288,000
[45] Date of Patent: Feb. 22, 1994

[54] JACK CADDY APPARATUS

[76] Inventor: Steven J. Adamson, P.O. Box 1448, Crescent City, Calif. 95531

[21] Appl. No.: 988,852

[22] Filed: Dec. 10, 1992

[51] Int. Cl.⁵ .............................................. B60R 9/00
[52] U.S. Cl. ...................... 224/42.03 A; 224/42.03 R
[58] Field of Search ............... 224/42.03 R, 42.03 A, 224/42.05, 42.04, 273, 42.45 R, 42.42, 42.38, 42.32

[56] References Cited

U.S. PATENT DOCUMENTS

| | | | |
|---|---|---|---|
| 1,210,985 | 1/1917 | Pratt | 224/42.38 |
| 4,674,933 | 6/1987 | Brown | 224/42.03 A |
| 4,795,067 | 1/1989 | Hamilton | 224/42.42 |
| 5,102,020 | 4/1992 | Walker et al. | 224/42.42 |
| 5,199,842 | 4/1993 | Watt et al. | 224/42.03 R |
| 5,201,445 | 4/1993 | Axelman | 224/904 |

FOREIGN PATENT DOCUMENTS 556164 7/1923 France .............................. 224/42.38

Primary Examiner—Linda J. Sholl
Attorney, Agent, or Firm—Leon Gilden

[57] ABSTRACT

A tubular housing is arranged for mounting to a forward bumper of an associated automobile for the storage of a jack structure therewithin for ease of transport and removal of the jack structure relative to the housing. A lock pin is directed through the housing and through the associated jack for the securement of the jack relative to the housing.

4 Claims, 4 Drawing Sheets

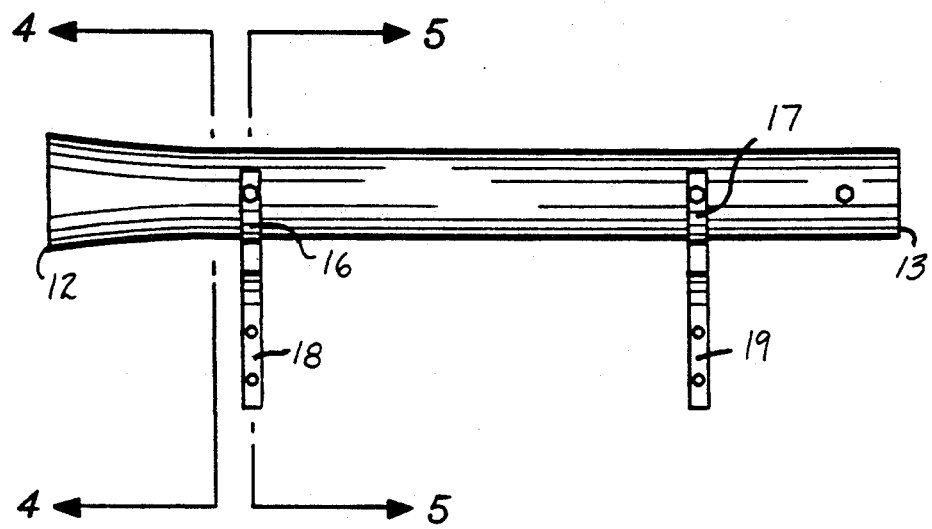
FIG. 3
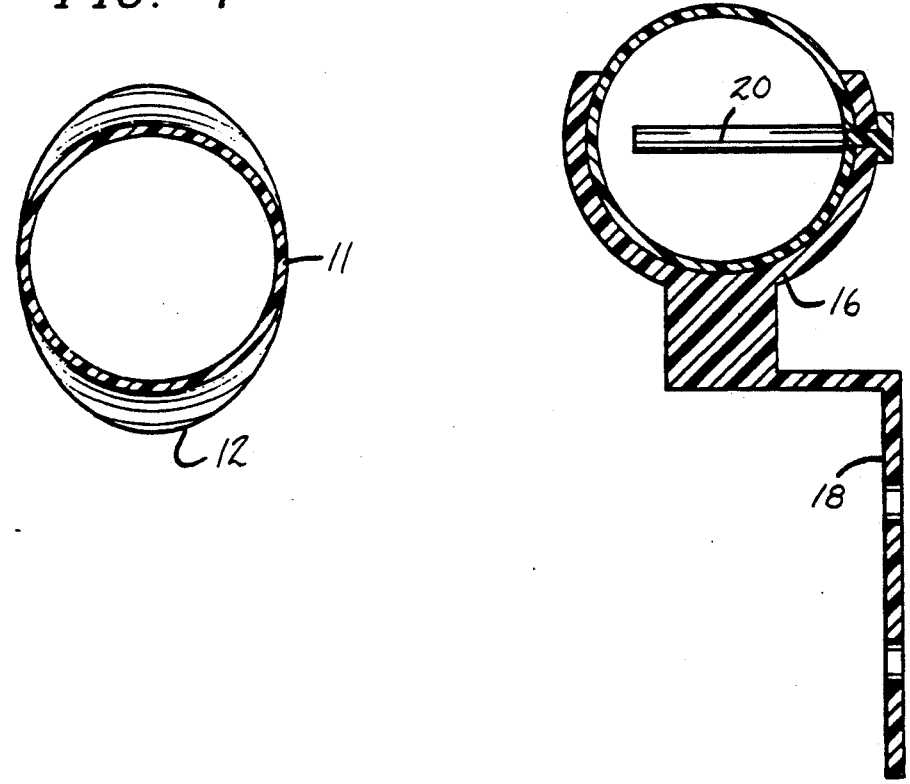
FIG. 4
FIG. 5

JACK CADDY APPARATUS

BACKGROUND OF THE INVENTION

1. Field of the Invention

The field of invention relates to jack storage structure, and more particularly pertains to a new and improved jack caddy apparatus wherein the same is arranged for mounting to a motor vehicle.

2. Description of the Prior Art

The prior art has heretofore employed various organizations to permit storage relative to a trunk bumper. Such apparatus is indicated in U.S. Pat. No. 4,073,082 for mounting various signs.

U.S. Pat. No. 4,127,295 to Robinson sets forth a trunk bumper for mounting a cable winch structure.

The instant invention is addressed to overcome deficiencies of the prior art by providing for a housing assembly for the storage of jack structure for ease of access to the bumper structure during periods of non-use.

SUMMARY OF THE INVENTION

In view of the foregoing disadvantages inherent in the known types of storage apparatus now present in the prior art, the present invention provides a jack caddy apparatus wherein the same is arranged for the mounting of jack equipment within a housing relative to an associated vehicular bumper. As such, the general purpose of the present invention, which will be described subsequently in greater detail, is to provide a new and improved jack caddy apparatus which has all the advantages of the prior art storage apparatus and none of the disadvantages.

To attain this, the present invention provides a tubular housing arranged for mounting to a forward bumper of an associated automobile for the storage of jack structure therewithin for ease of transport and removal of the jack structure relative to the housing. A lock pin is directed through the housing and through the associated jack for the securement of the jack relative to the housing.

My invention resides not in any one of these features per se, but rather in the particular combination of all of them herein disclosed and claimed and it is distinguished from the prior art in this particular combination of all of its structures for the function specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved jack caddy apparatus which has all the advantages of the prior art storage apparatus and none of the disadvantages.

It is another object of the present invention to provide a new and improved jack caddy apparatus which may be easily and efficiently manufactured and marketed.

It is a further object of the present invention to provide a new and improved jack caddy apparatus which is of a durable and reliable construction.

An even further object of the present invention is to provide a new and improved jack caddy apparatus which is susceptible of a low cost of manufacture with regard to both materials and labor, and which accordingly is then susceptible of low prices of sale to the consuming public, thereby making such jack caddy apparatus economically available to the buying public.

Still yet another object of the present invention is to provide a new and improved jack caddy apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view of the invention.

FIG. 4 is an orthographic view, taken along the lines 4—4 of FIG. 3 in the direction indicated by the arrows.

FIG. 5 is an orthographic view, taken along the lines 5—5 of FIG. 3 in the direction indicated by the arrows.

DESCRIPTION OF THE PREFERRED EMBODIMENT

Figure 1:
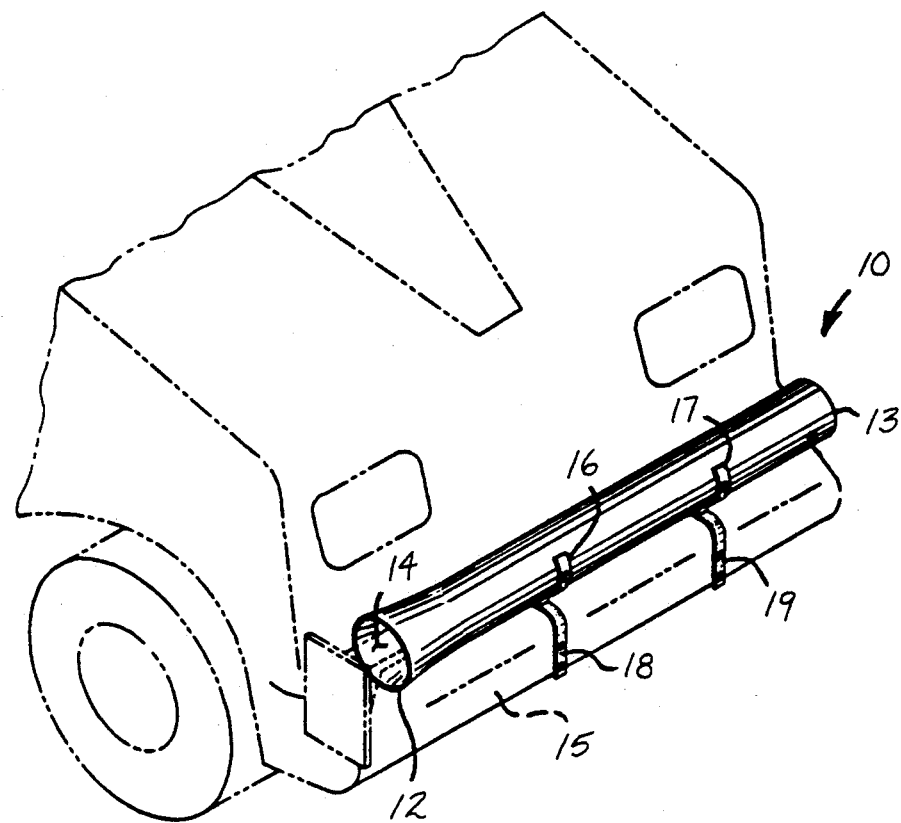
FIG. 1 is an isometric illustration of the invention in use.
Figure 2:
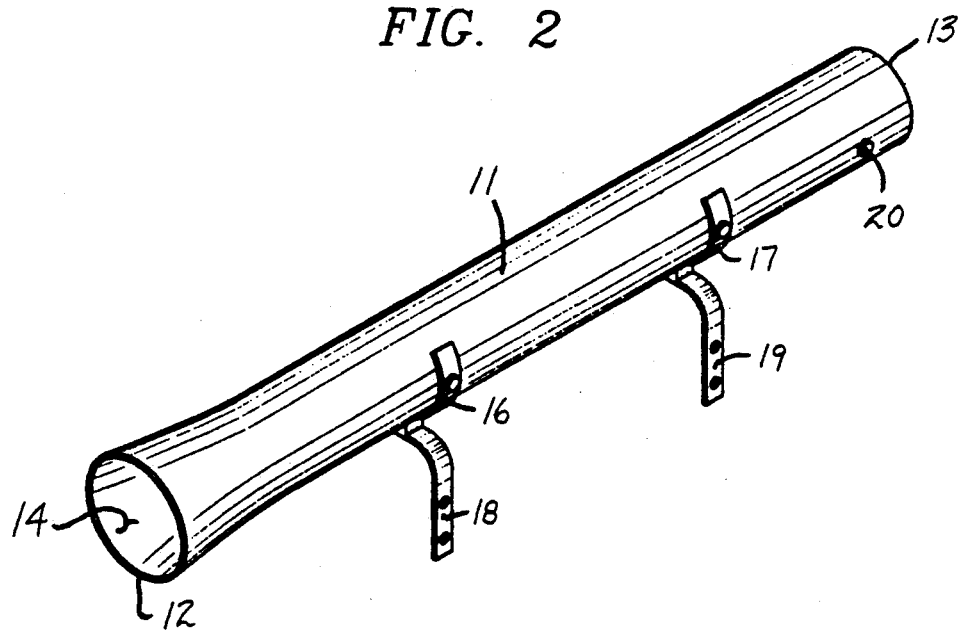
FIG. 2 is an enlarged isometric illustration of the invention.
Figure 6:
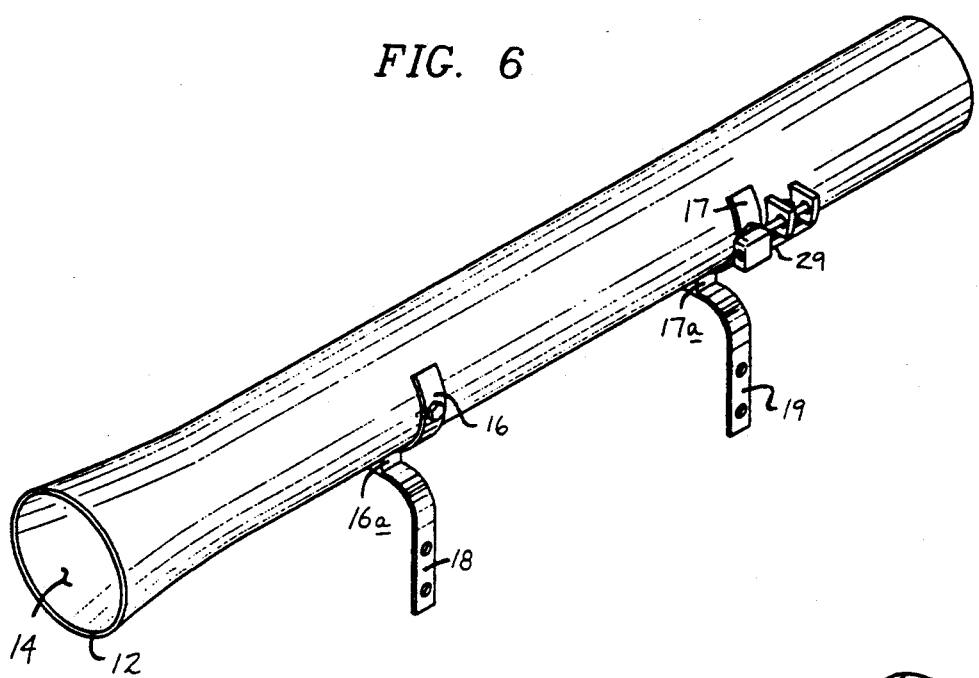
FIG. 6 is an isometric illustration of the invention employing a locking structure relative to the lock pin of the invention.

With reference now to the drawings, and in particular to FIGS. 1 to 9 thereof, a new and improved jack caddy structure embodying the principles and concepts of the present invention and generally designated by the reference numeral 10 will be described.

More specifically, the jack caddy apparatus 10 of the instant invention essentially comprises a tubular housing 11 having a first end 12 spaced from a second end 13, with the first end 12 having a first end entrance conical opening 14 to permit ease of access within the housing 11. The housing 11 is arranged for mounting upon a vehicular bumper 15, as indicated in FIG. 1, wherein a first and second semi-cylindrical cradle 16 and 17 respectively are fixedly mounted between the housing 11 and respective first and second mounting straps 18 and 19. The structure, as indicated in the FIGS. 1 and 2 for example, indicates the first and second mounting straps 18 and 19 fixedly secured to respective first and second cradle mounts 16a and 17a that are interposed between the mounting straps and the cradles. A lock pin 20 is arranged for projection through the housing 11 in a diametrically aligned relationship relative to the housing in adjacency to the second end 13. The lock pin 20 may be threadedly directed through the housing 11 or frictionally retained as desired. The lock pin 20, as indicated and illustrated in the FIG. 7 for example, is received through a jack tool 21, and more specifically through a jack tool bore 22 of the jack tool 21 for securement of the jack tool within the housing 11. The structure, as set forth in the FIGS. 6 and 7, includes first and second parallel flanges 23 and 24 having respective first and second flange bores 25 and 26 that are coaxially aligned to receive a lock member 29 through the first and second flange bores 25 and 26 to prevent unauthorized removal of the lock pin 20 and associated removal of the jack tool structure 21 from within the housing 11.

Figure 7:
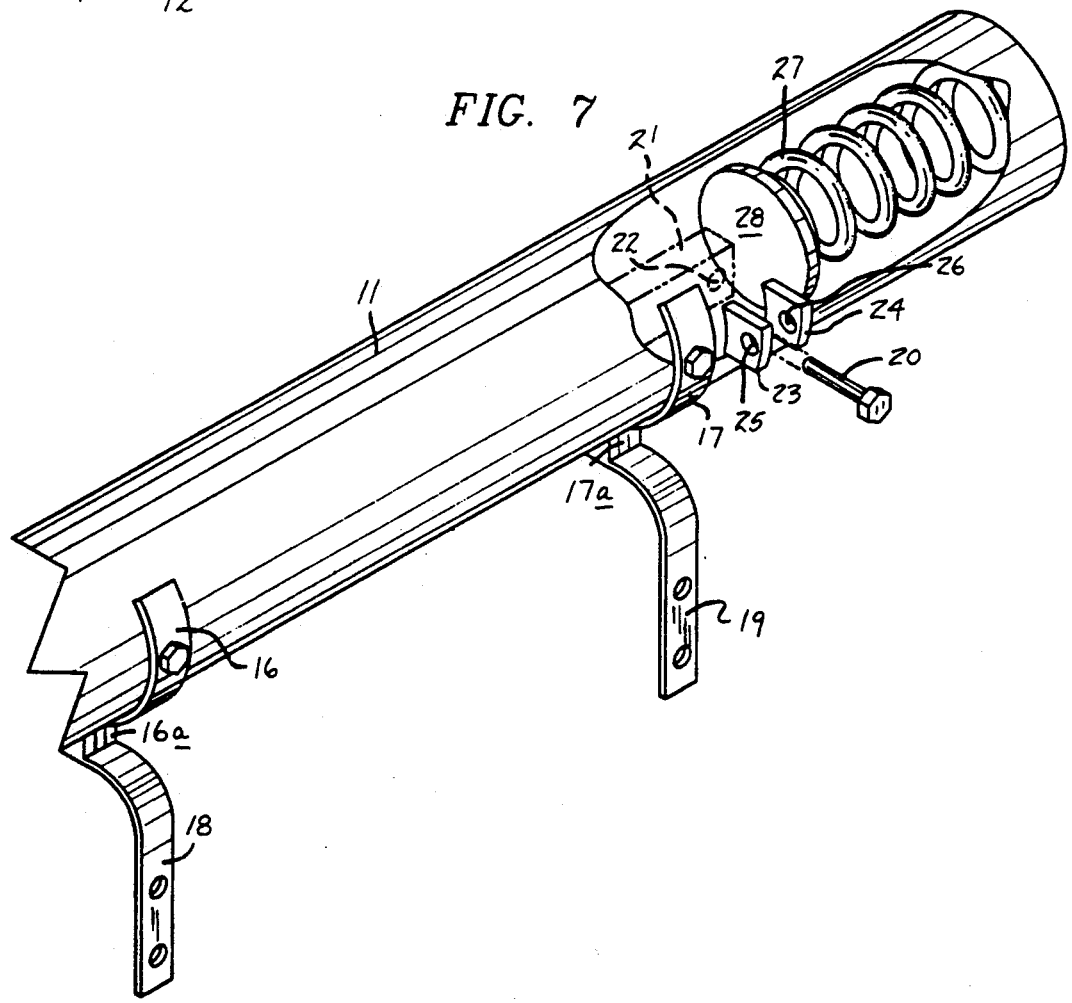
FIG. 7 is a partial isometric view indicating the use of an automatic ejector structure relative to the jack of the invention.

The FIG. 7 further indicates the use of a spring member 27, having a spring member abutment plate 28 arranged for biased abutment against the jack tool 21 to bias the jack tool for its ejection, whereupon removal of the lock pin 20 permits the spring member 27 to extend and project the jack tool 21 from the housing, and more specifically through the housing's first end entrance opening 14.

Figure 8:
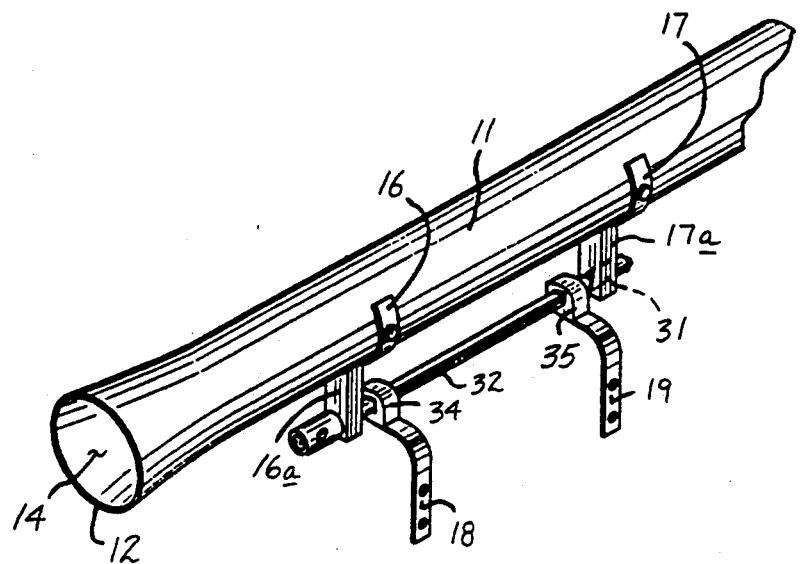
FIG. 8 is an isometric illustration of the invention employing a removable support rod structure relative to the housing for ease of removal of the housing relative to the associated vehicle.
Figure 9:
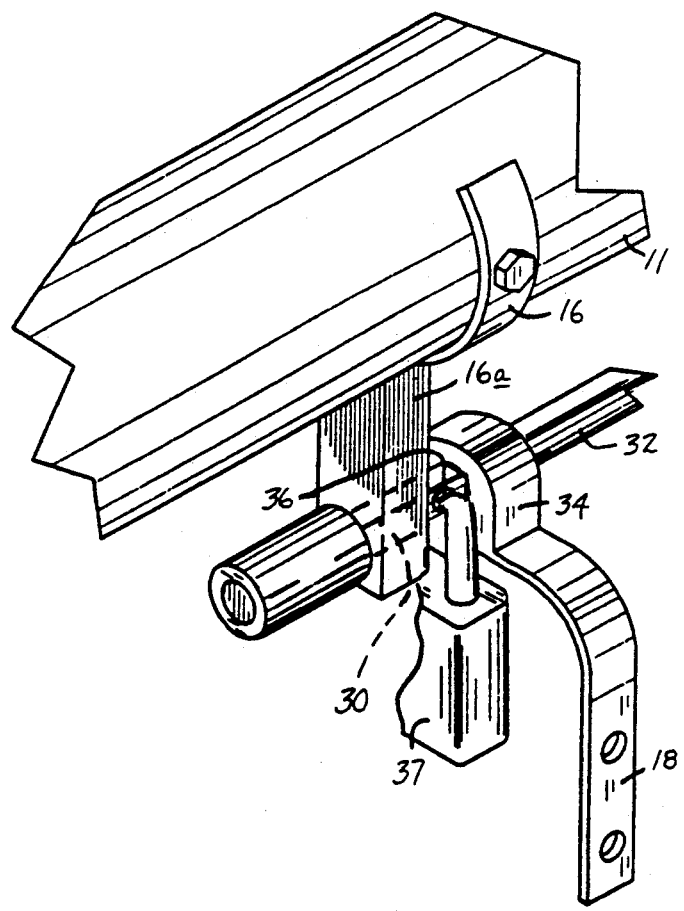
FIG. 9 is an enlarged isometric illustration of a locking structure relative to the support rod of the invention, as indicated in FIG. 8.

The FIGS. 8 and 9 indicate the optional use of a support rod 32 that is of a parallelepiped configuration, having sliding reception through first and second parallelepiped bores 30 and 31 that are coaxially aligned through the respective first and second cradle mounts 16a and 17a. A support rod bore 36 is positioned between a first mounting strap hub 34 and the first cradle mount 16a to receive the support rod lock member 37 to prevent unauthorized removal of the tubular housing 11 from the associated first and second mounting strap hubs 34 and 35 that have the first and second mounting straps 18 and 19 fixedly secured thereto, that are in turn secured to the vehicular bumper 15. The use of the organization, as indicated in FIGS. 8 and 9, permits the selective removal of the tubular housing 11 from the bumper 15 for its storage and mounting to other such vehicles equipped with the mounting strap hubs 34 and 35 and associated mounting straps 18 and 19.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A jack caddy apparatus, comprising, a coaxially aligned elongate tubular housing, having a first end spaced from a second end, and the first end having a first end entrance opening, and a first semi-cylindrical cradle and a second semi-cylindrical cradle fixedly mounted to the tubular housing in a spaced parallel relationship, and a first mounting strap and a second mounting strap for securement to a vehicular bumper, with the first mounting strap and the second mounting strap including mounting means for securement of the first mounting strap and the second mounting strap to the first cradle and the second cradle, and the first end entrance opening is of a conical configuration permitting ease of access into the tubular housing, and a jack tool positioned within the tubular housing, and the jack tool having a jack tool bore, and a lock pin directed diametrically through the tubular housing into the tubular housing in adjacency to the second end, and the lock pin directed through the jack tool bore, and the first cradle includes a first cradle mount fixedly secured to the first cradle, the second cradle having a second cradle mount secured to the second cradle, and the first mounting strap having a first mounting strap hub, the second mounting strap having a second mounting strap hub, wherein the first mounting strap hub and the second mounting strap hub are arranged in a spaced relationship relative to one another, the first mounting strap hub having a first parallelepiped bore, the second mounting strap hub having a second rectilinear bore, wherein the first rectilinear bore and the second rectilinear bore are coaxially aligned, and the mounting means includes a support rod directed through the first cradle mount and the second cradle mount and through the first mounting strap bore and the second mounting strap bore for securement and association of the first cradle mount and the second cradle mount to the first mounting strap hub and the second mounting strap hub.

2. An apparatus as set forth in claim 1 wherein the support rod includes a support rod bore positioned between the first mounting strap hub and the first cradle mount, wherein the support rod is directed through the first cradle mount, the second cradle mount, the first mounting strap hub and the second mounting strap hub, and a lock member received through the support rod bore in a selective relationship permitting removal of the support rod from the first cradle mount and the second cradle mount when the lock member is removed from the support rod bore.

3. An apparatus as set forth in claim 2 including a spring member mounted in adjacency to the second end of the tubular housing, with the spring member including an ejector plate mounted to the spring member in abutment with the jack tool, wherein the jack tool is positioned within the tubular housing adapted to project the jack tool from the tubular housing when the lock pin is removed from the tubular housing.

4. An apparatus as set forth in claim 3 including a first flange and a second flange arranged in a parallel relationship fixedly mounted to the tubular housing on opposed sides of the lock pin, and the first flange includes a first flange bore, the second flange includes a second flange bore, the first flange bore and the second flange bore are coaxially aligned and a flange bore lock is arranged for reception through the first flange bore and the second flange bore to extend over and in adjacency to the lock pin permitting removal of the lock pin.

* * * * *